(12) United States Patent
Walker

(10) Patent No.: US 11,648,634 B1
(45) Date of Patent: May 16, 2023

(54) END EFFECTOR FOR GRIPPING A V-RING ON A TOOLHOLDER

(71) Applicant: Techniks, LLC, Indianapolis, IN (US)

(72) Inventor: Jared Walker, Rochester, NY (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/955,008

(22) Filed: Sep. 28, 2022

Related U.S. Application Data

(63) Continuation of application No. 17/878,883, filed on Aug. 1, 2022, now abandoned.

(51) Int. Cl.
  *B25J 15/00* (2006.01)
  *B25J 15/08* (2006.01)
  *B23Q 3/155* (2006.01)

(52) U.S. Cl.
  CPC ............ *B23Q 3/1554* (2013.01); *B25J 15/00* (2013.01); *B25J 15/0038* (2013.01); *B25J 15/086* (2013.01)

(58) Field of Classification Search
  CPC ............... B25J 15/0033; B25J 15/0038; B25J 15/0042; B25J 15/0253; B25J 15/0293; B25J 15/045; B25J 15/0475; B25J 15/08; B25J 15/086; B23Q 3/1554; B23Q 2003/155407
  See application file for complete search history.

(56) References Cited

U.S. PATENT DOCUMENTS

| | | | | |
|---|---|---|---|---|
| 3,990,140 A | * | 11/1976 | Polacek | B23Q 3/1554 483/65 |
| 4,647,097 A | * | 3/1987 | Lessway | B25J 15/028 294/902 |
| 4,699,414 A | * | 10/1987 | Jones | B25J 15/026 294/902 |
| 4,845,834 A | * | 7/1989 | Watson | B23Q 3/1554 483/34 |
| 5,080,415 A | * | 1/1992 | Bjornson | B25J 9/1015 901/31 |
| 5,267,766 A | * | 12/1993 | Geissler | B23Q 3/1554 483/49 |
| 6,076,875 A | * | 6/2000 | Neff | B25J 15/0253 414/751.1 |
| 8,752,872 B2 | | 6/2014 | Kent | |
| 10,440,870 B1 | * | 10/2019 | Solanki | H05K 13/0408 |
| 2008/0213076 A1 | | 9/2008 | Hanson et al. | |
| 2022/0176571 A1 | * | 6/2022 | Brennwald | B25J 15/0028 |

FOREIGN PATENT DOCUMENTS

| | | | | |
|---|---|---|---|---|
| CN | 111469122 B | * | 10/2021 | ......... B25J 15/0038 |
| DE | 102010053145 A1 | * | 6/2012 | ......... B05B 15/045 |

* cited by examiner

*Primary Examiner* — Dean J Kramer
(74) *Attorney, Agent, or Firm* — Shuttleworth & Ingersoll, PLC; Jason Sytsma

(57) ABSTRACT

A pair of grippers movable with respect to each other and each of which comprising a body presenting an annular ring oriented perpendicular with respect to a longitudinal length of the end effector. The annular ring of each gripper of the pair of grippers is oriented facing each other so that a space between the annular ring of each gripper of the pair of grippers increases and decreases as the pair of mounting blocks move laterally towards and away from each other.

19 Claims, 5 Drawing Sheets

END EFFECTOR FOR GRIPPING A V-RING ON A TOOLHOLDER

CROSS-REFERENCE TO RELATED APPLICATIONS

This application is a continuation of U.S. patent application Ser. No. 17/878,883 filed Aug. 2, 2022, the entirety of which is incorporated by reference herein.

TECHNICAL FIELD

This disclosure relates to end effectors, and, more specifically, this disclosure relates to an end effector for gripping a v-ring of a tool holder for placement in a CNC machining center.

BACKGROUND INFORMATION

The use of robots is widespread in the manufacturing industry, due to their ability to process a large number of work pieces through many different processing technologies, and to perform repetitive tasks quickly and accurately. The use of robots is especially advantageous in portions of manufacturing lines where human handling of tooling is inefficient or undesirable. For example, changing tooling is a repetitive task where decreasing the amount of time it takes to change out tooling greatly decreases manufacturing time and labor costs.

Accordingly, there is a need for an end effector for gripping a v-ring on a tool holder.

SUMMARY

In accordance with one aspect of the present invention, provided is an end effector attachable to a robotic arm for gripping a tool holder. The end effector comprises of a pair of grippers movable with respect to each other and each of which comprising a body presenting an annular ring oriented perpendicular with respect to a longitudinal length of the end effector. The annular ring of each gripper of the pair of grippers is oriented facing each other so that a space between the annular ring of each gripper of the pair of grippers increases and decreases as the pair of mounting blocks move laterally towards and away from each other.

In an embodiment, the annular ring of the body of the gripper has a profile that corresponds to a profile of a groove on an outer most diameter of the tool holder, The annular ring of the body of the gripper can comprise a top chamfer comprising an angle α and a bottom chamfer comprising an angle α both of which correspond to the profile of the groove of the outer most diameter of the tool holder.

The body of the gripper can comprise of a front face having a top portion and a bottom portion with an arcuate ninety degree curvature in between to orient the annular ring perpendicular to the longitudinal length of the end effector and perpendicular to the top portion and the bottom portion of the front face.

In an embodiment, a pair of mounting blocks can be provided each of which being attachable to the robotic arm for lateral movement with respect to each other with the pair of grippers being attached to corresponding one of the other end of the pair of mounting blocks. In addition, a pair of extension blocks can be provided to combine between the corresponding one of the pair of mounting blocks and the pair of grippers to selectively increase a longitudinal length of the end effector.

In order to attach the various parts of the end effector, at least one fastener can be provided to selectively combine one of the corresponding extension block and the mounting block of the pair of extension blocks and the pair mounting blocks. In addition, at least one connecting pin can be provided to selectively align one of the corresponding extension block and the mounting block of the pair of extension blocks and the pair of mounting blocks, The gripper can comprise a projecting member extending from the bottom in a direction oriented normal to the bottom portion of the front face of the gripper to correspond with a receptacle in the extension block sized to receive the projecting member of the body of the gripper. A through hole extending from a surface opposite a bottom portion of a front face of the gripper through a body of the gripper can be provided so that a gripper fastener can extend into the through hole out of the projecting member of the body of the gripper into the through hole of the receptacle to attach inside the extension member. The extension block and the gripper can be attached such that a top portion of the front face of the gripper is flush with a corresponding face of the extension block.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
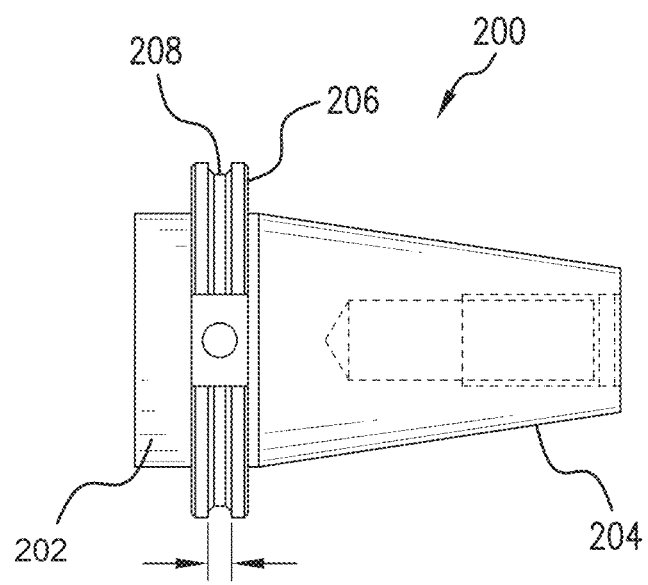
FIG. 1 is a prior art tool holder.
Figure 2:
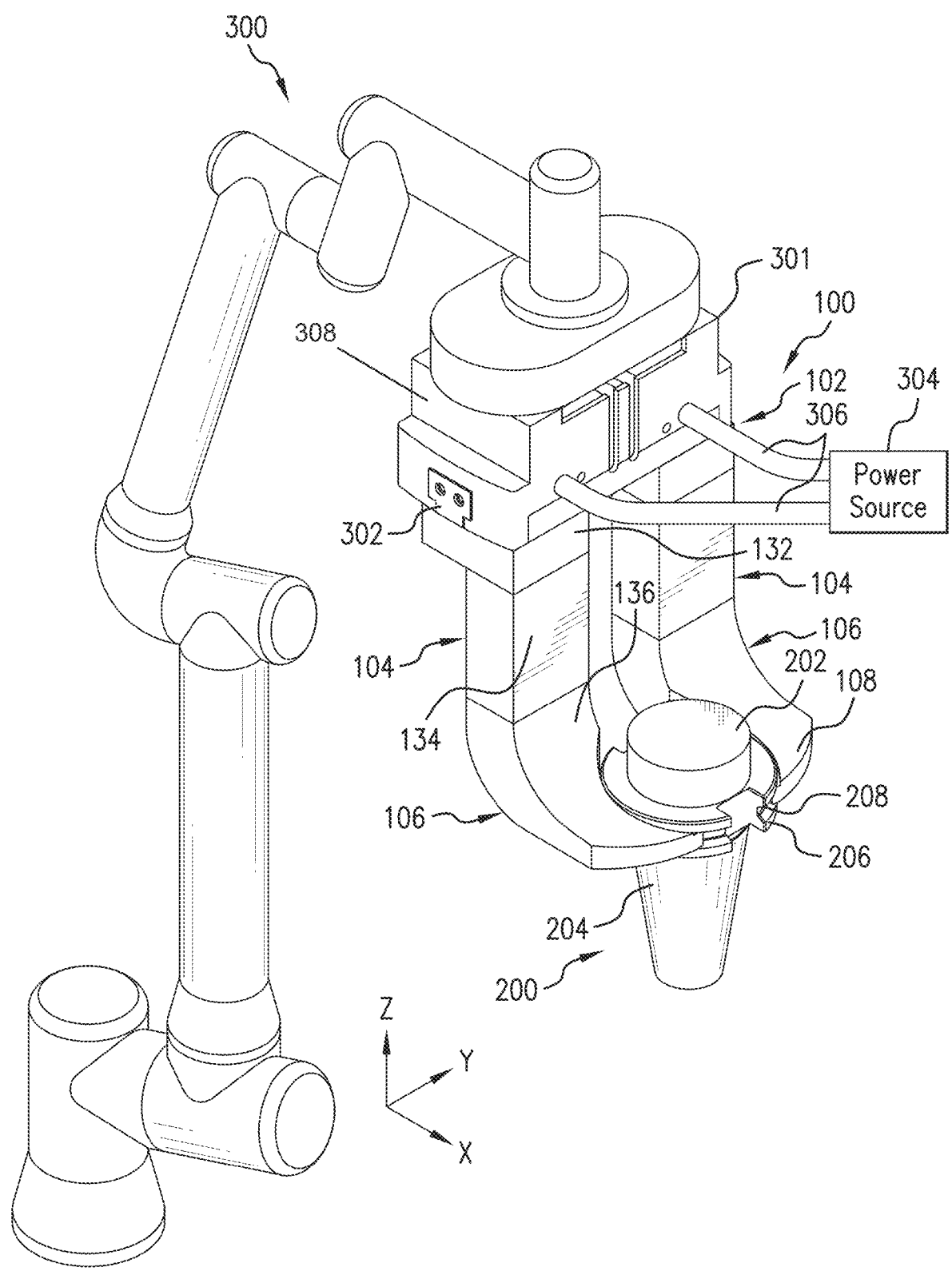
FIG. 2 is a perspective view of an end effector gripping a tool holder for a CNC machine according to this disclosure.

Referring to FIG. 2, shown is a perspective view of an end effector 100 gripping a tool holder 200 for a CNC machine according to this disclosure. Referring back to FIG. 1, tool holder 200 can take many forms, including the Caterpillar "V-Flange" ("CAT") standard, also known as an ANSI B5.50, illustrated in FIG. 1. Tool holder 200 generally comprises of a receiver 202 configured to hold the tool and a taper 204 for attaching tool holder 200 to a CNC machine center.

Receiver 202 can comprise a collet pocket, into which the collet is inserted before being secured by various types of collet nuts, it can be a shrink-fit style tool holder, or any other type known to those skilled in the art. Taper 204 is the conical shaped area of tool holder 200 that enters the spindle of a CNC machine center. Tool holder 200 can have any style of taper. Some tool holders 200, for example, like HSK have a shorter taper than BT or CAT style.

Tool holder 200 further comprises a V-flange 206, which is the part of tool holder 200 that an automatic tool changer locks onto when moving tool holder 200 from the tool changer to the spindle and back again. V-flange 206 is visually identified as a "V" groove 208 found on the outer most diameter of tool holder 200. Cutouts in v-flange 206 help orientate tool holder 200 in the spindle.

Returning to FIG. 2, end effector 100 is configured for attachment to a robotic arm 300 by way of an actuator block 301 driven by a power source 304. Actuator block 301 comprises of central housing 308 with a pair of sliding blocks 302 that are driven laterally towards and away from each other and with respect to central housing 308 by power from power source 304 supplied by supply lines 306. End effector 100 is then attached to pair of sliding blocks 302, in a manner described more thoroughly below. Power from power source 304 causes pair of sliding blocks 302 to open or close, which translates to the opening or closing of end effector 100. In an embodiment, power source 304 is a pneumatic power source that supplies pneumatic power via air supply lines 306 to central housing 308 of actuator block 301. Pneumatic power causes sliding blocks 302 to move laterally towards and away from each other (i.e., close and open), which translates to the closing and opening of end effector 100. Those skilled in the art will recognize that power source 304 and supply lines 306 can include an electric or hydraulic system. As will be apparent from the following description, this lateral movement of the pair of sliding blocks 302 with respect to each other corresponds to the opening and closing of end effector 100. Sliding blocks 302, however, can be configured for longitudinal movement back and forth, arcuate movement with respect to each other, or any other type of opening and closing motion.

Figure 3:
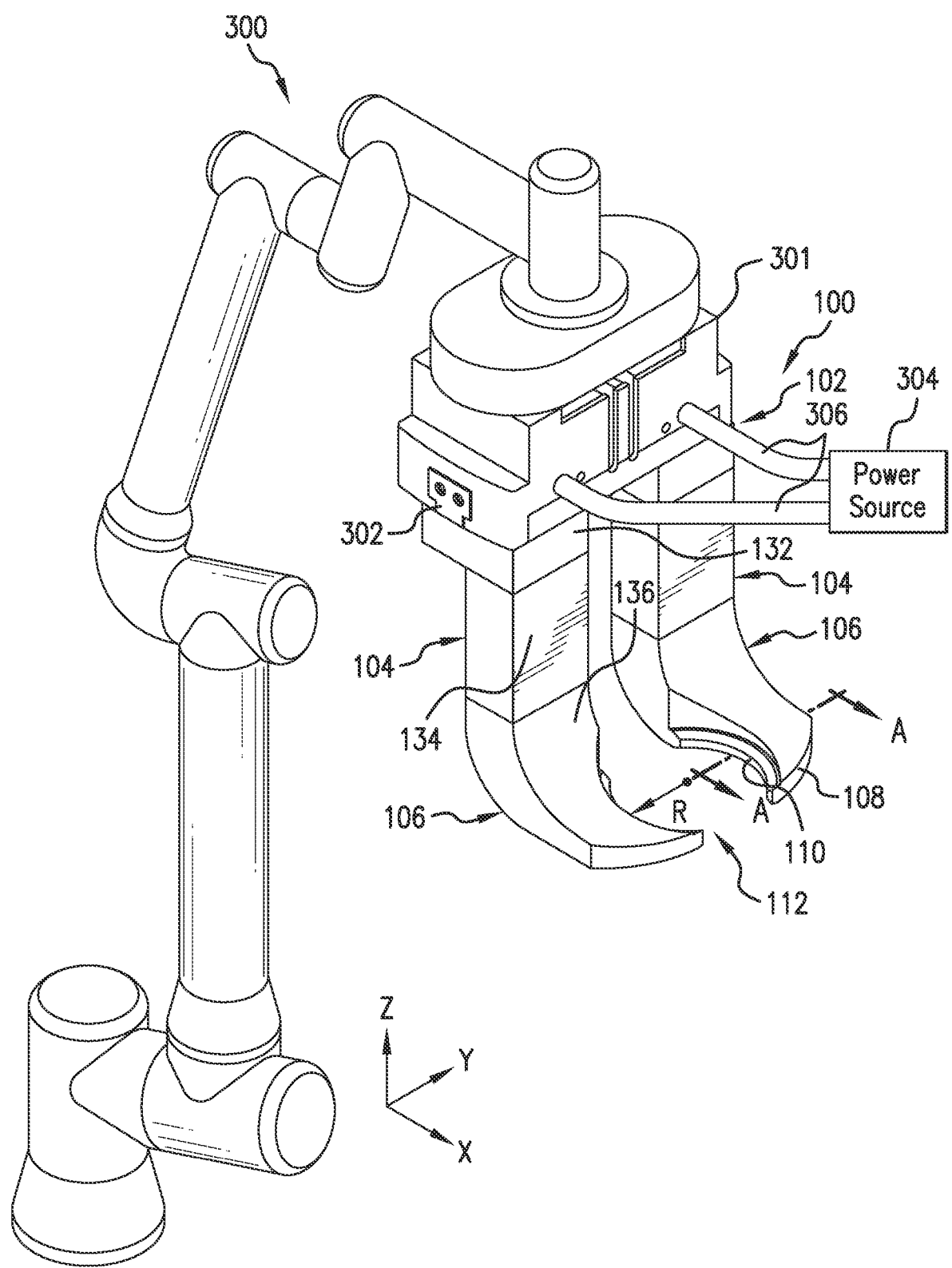
FIG. 3 is the end effector of FIG. 2 with the tool holder removed.

FIG. 3 shows end effector 100 in the open position without tool holder 200. End effector 100 comprises of a pair of mounting blocks 102 each of which being attachable to corresponding sliding blocks 302 of actuator block 301 of robotic arm 300. As described above, robotic arm 300 uses a power source 304 to move sliding blocks 302 of actuator block 301 laterally back and forth which corresponds to lateral movement pair of mounting blocks 102 with respect to each other.

A pair of extension blocks 104 are combined to a corresponding one of mounting blocks 102. Extension blocks 104 are each selectively combinable with mounting block 102 so that the relative length of end effector 100 can be adjusted.

Finally, a pair of grippers 106 are provided with each one of which being attached to a corresponding one of extension blocks 104. Each gripper 106 comprises of a body 108 presenting an annular ring 110 oriented perpendicular with respect to extension block 104. Annular ring 110 of each gripper 106 is oriented facing the other annular ring 110 of other gripper 106 so that a space 112 between each annular ring 110 increases and decreases as the pair of mounting blocks 102 move laterally towards and away from each other.

Figure 4:
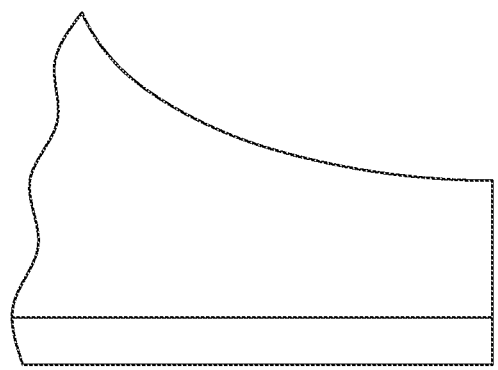
FIG. 4 is a side view of the end effector of FIG. 2.
Figure 5:
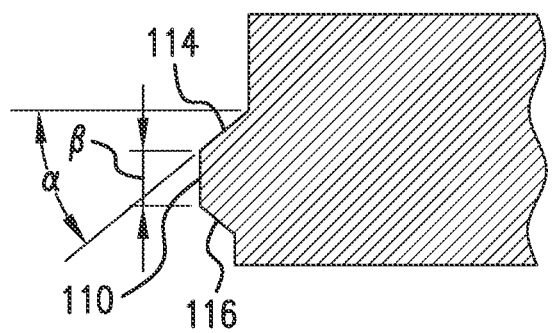
FIG. 5 is cross-sectional view of the gripper taken on the line A-A of FIG. 3.

Turning briefly to FIGS. 4-5, shown are a side view and a cross-sectional view of gripper 106, respectively, Annular ring 110 can comprise a radius of substantially 2.250" which corresponds to the outer most diameter of tool holder 200 where V-flange 206 is located. Annular ring 110 is defined by a top chamfer 114 and a bottom chamfer 116 each of which comprising an angle α, which corresponds to the angle of "V" groove 208 in V-flange 206 of tool holder 200. In an embodiment, angle α can range from thirty degrees to eighty degrees, or any value in between, wherein the illustrated embodiment shows an angle a of sixty degrees. Those skilled in art will recognize that the dimension of annular ring 110 and angle α can be modified in any manner to match the gripping portion of grippers 106 to tool holder 200.

Figure 6:
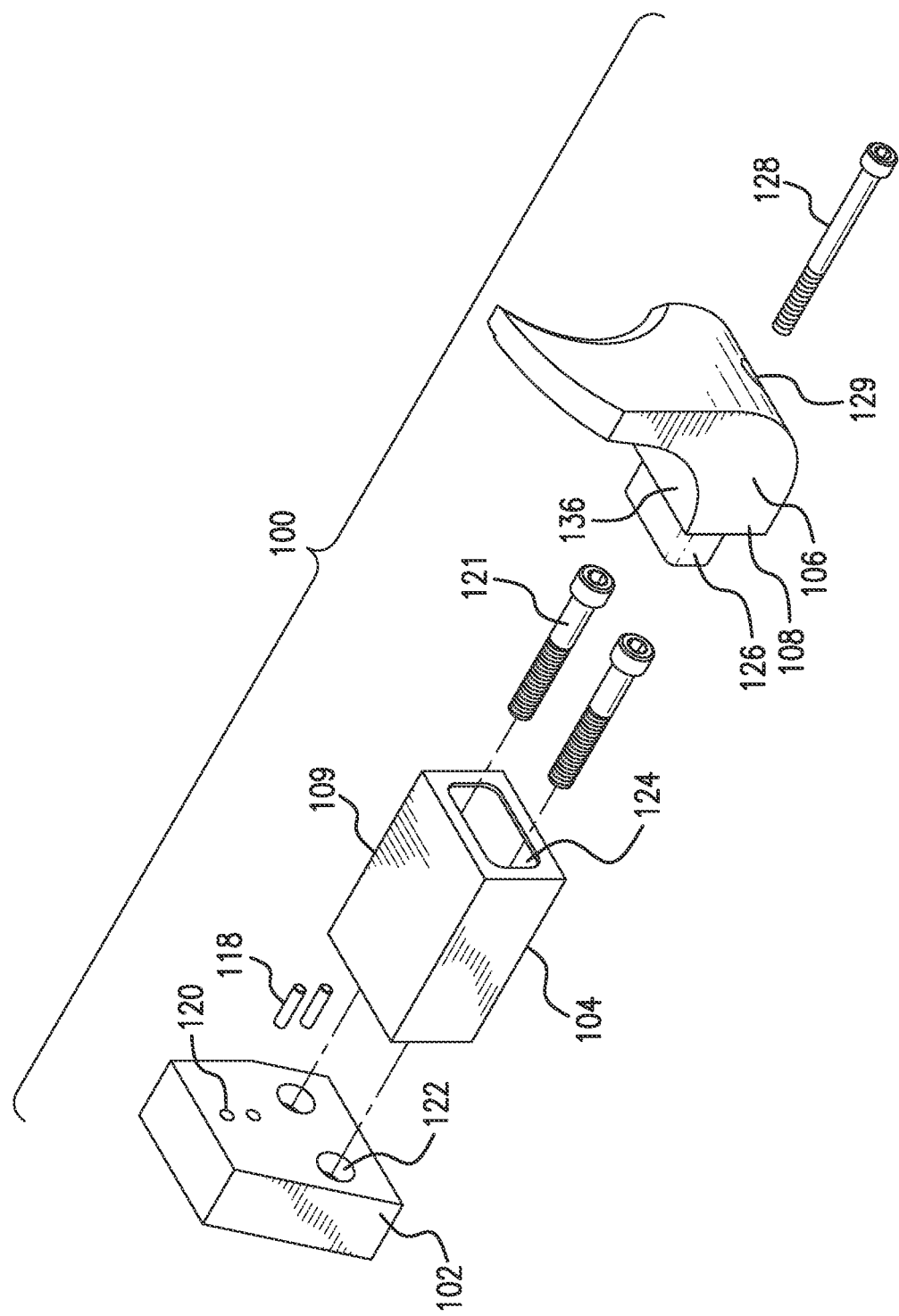
FIG. 6 is an exploded view of the end effector of FIG. 2.

Turning to FIG. 6, shown is an exploded view of one half of end effector 100. Mounting blocks 102 are each of a cuboid shape. A pair of mounting holes extend along a z-axis at one end for attaching mounting blocks 102 to actuator block 301 of robotic arm 300 by fasteners 121. On the underside of mounting blocks 102 are threaded bores 122 (described below) for combining mounting block 102 to extension block 104. Also, mounting block 102 is combined to extension block 104 by one or more connecting pins 118 with corresponding receiving holes 120 in mounting block 102 and in extension block 104.

This configuration positions each of extension blocks 104 forward on the x-axis with respect to mounting holes so that a front face of actuator block 301, which is oriented on the z-plane, is flush with a front face 134 of extension block 104. Extension blocks 104 are also of a cuboid shape. As described above, extension block 104 can have various longitudinal lengths, which can be swapped out for different applications where an end effector 100 with a longer longitudinal length is desired.

Extension blocks 104 are combined to respective mounting blocks 102 by threading connecting bolts 121 into threaded bores 122 of mounting blocks 102. Extension blocks 104 also have a receptacle 124, which can be generally rectangular shaped to receive gripper 106. Gripper 106 has a corresponding projecting member 126, which is generally rectangular shaped to fit into receptacle 124. Gripper 106 is further secured to extension block 104 with a through bolt or gripper fastener 128 that extends through a hole 129 in the bottom of gripper 106 and into a threaded hole inside extension block 104.

Gripper 106 also has a front face 136 with an arcuate ninety degree curvature with a top portion of front face 136 being perpendicular to a bottom portion of front face 136 to orient annular ring 110 perpendicular with respect to the longitudinal length of end effector 100, At the top of gripper 106, front face 136 is flush with front face 134 of extension block 104 or normal with respect to the x-axis. At the bottom of gripper 106 front face 136 is perpendicular to front face 134 of extension block 104 or normal with respect to the z-axis.

End effector 100 described herein when combined to robotic arm 300 allows tool holder 200 to be lifted from its side by v-flange 206. Compared to the prior art end effectors used for picking tool holder 200 up by the top, end effector 100 is a more compact design. This allow tool holders 200 to be positioned closer together because end effector 100 can get into tighter spaces. End effector 100 is also easily modified by swapping out extension blocks 104 to adjust the longitudinal length or swapping out grippers 106 for different styles of tool holders 200.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. An end effector attachable to a robotic arm for gripping a tool holder, the end effector comprising:
   a pair of grippers movable with respect to each other and each of which comprising a body presenting an annular ring oriented perpendicular with respect to a longitudinal length of the end effector, wherein the annular ring of each gripper of the pair of grippers is oriented facing each other so that a space between the annular ring of each gripper of the pair of grippers increases and decreases as a pair of mounting blocks move laterally towards and away from each other, wherein the body comprises of a front face having a top portion and a bottom portion with an arcuate ninety degree curvature in between to orient the annular ring perpendicular to the longitudinal length of the end effector and perpendicular to the top portion and the bottom portion of the front face.

2. The end effector of claim 1, wherein the annular ring of the body of the gripper further comprises a top chamfer comprising an angle α.

3. The end effector of claim 2, wherein the annular ring of the body of the gripper further comprises a bottom chamfer comprising an angle α.

4. The end effector of claim 3, wherein the angle α is substantially equal to sixty degrees.

5. The end effector of claim 1, wherein the annular ring of the body of the gripper has a profile that corresponds to a profile of a groove on an outer most diameter of the tool holder.

6. The end effector of claim 5, wherein the annular ring of the body of the gripper further comprises a top chamfer comprising an angle α and a bottom chamfer comprising an angle α both of which correspond to the profile of the groove of the outer most diameter of the tool holder.

7. The end effector of claim 1, wherein the pair of mounting blocks are each attachable to the robotic arm for lateral movement with respect to each other with the pair of grippers being attached to corresponding one of the other end of the pair of mounting blocks.

8. The end effector of claim 7, a pair of extension blocks combined between the corresponding one of the pair of mounting blocks and the pair of grippers to selectively increase a longitudinal length of the end effector.

9. The end effector of claim 8, and further comprising at least one fastener to selectively combine one of the corresponding extension block and the mounting block of the pair of extension blocks and the pair mounting blocks.

10. The end effector of claim 9, and further comprising at least one connecting pin to selectively align one of the corresponding extension block and the mounting block of the pair of extension blocks and the pair of mounting blocks.

11. The end effector of claim 8, and further comprising a gripper fastener to selectively combine one of the corresponding extension block and the gripper of the pair of extension blocks and the pair of grippers.

12. The end effector of claim 11, and further comprising a through hole extending from a surface opposite a bottom portion of a front face of the gripper through a body of the gripper, wherein the gripper fastener extends into the through hole.

13. The end effector of claim 12, wherein the gripper further comprises a projecting member extending from the bottom in a direction oriented normal to the bottom portion of the front face of the gripper, and wherein an extension member further comprises a receptacle sized to receive the projecting member of the body of the gripper, and wherein the gripper fastener extends out of the projecting member of the body of the gripper into a through hole of the receptacle to attach inside the extension member.

14. The end effector of claim 8, wherein a top portion of the front face of the gripper is flush with a corresponding face of the extension block.

15. The end effector of claim 1, wherein the end effector is configured for attachment to corresponding sliding blocks of an actuator block, wherein sliding movement of the sliding blocks of the actuator block corresponds to opening and closing of the end effector.

16. An end effector attachable to a robotic arm for gripping a tool holder, the end effector comprising:
   a pair of grippers movable with respect to each other and each of which comprising a body presenting an annular ring oriented perpendicular with respect to a longitudinal length of the end effector, wherein the annular ring of each gripper of the pair of grippers is oriented facing each other so that a space between the annular ring of each gripper of the pair of grippers increases and decreases as a pair of mounting blocks move laterally towards and away from each other;
   wherein the pair of mounting blocks are each attachable to the robotic arm for lateral movement with respect to each other with the pair of grippers being attached to corresponding one of the other end of the pair of mounting blocks;
   a pair of extension blocks combined between the corresponding one of the pair of mounting blocks and the pair of grippers to selectively increase a longitudinal length of the end effector;
   at least one fastener to selectively combine one of the corresponding extension block and the mounting block of the pair of extension blocks and the pair mounting blocks;
   at least one connecting pin to selectively align one of the corresponding extension block and the mounting block of the pair of extension blocks and the pair of mounting blocks;
   a gripper fastener to selectively combine one of the corresponding extension block and the gripper of the pair of extension blocks and the pair of grippers; and
   a through hole extending from a surface opposite a bottom portion of a front face of the gripper through a body of the gripper, wherein the gripper fastener extends into the through hole.

17. The end effector of claim 16, wherein the body comprises of a front face having a top portion and a bottom portion with an arcuate ninety degree curvature in between to orient the annular ring perpendicular to the longitudinal length of the end effector and perpendicular to the top portion and the bottom portion of the front face.

18. The end effector of claim 17, wherein the gripper further comprises a projecting member extending from the bottom in a direction oriented normal to the bottom portion of the front face of the gripper, and wherein an extension member further comprises a receptacle sized to receive the projecting member of the body of the gripper, and wherein the gripper fastener extends out of the projecting member of the body of the gripper into a through hole of the receptacle to attach inside the extension member.

19. The end effector of claim 16, wherein the annular ring of the body of the gripper has a profile that corresponds to a profile of a groove on an outer most diameter of the tool holder.

* * * * *